Figure 1:
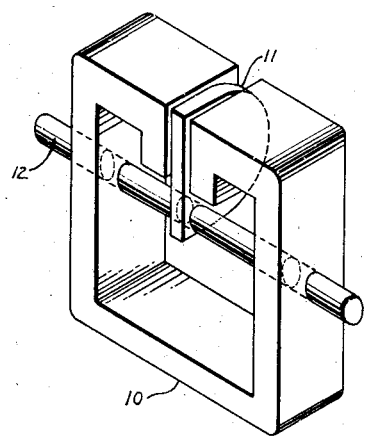

Feb. 26, 1946.   E. TOTH   2,395,520
TUNED INDUCTOR
Filed Sept. 9, 1943

Inventor
EMERICK TOTH

By
Attorney

Patented Feb. 26, 1946

2,395,520

UNITED STATES PATENT OFFICE 2,395,520

TUNED INDUCTOR

Emerick Toth, Cheverly, Md.

Application September 9, 1943, Serial No. 501,644

3 Claims. (Cl. 250—40)

(Granted under the act of March 3, 1883, as amended April 30, 1928; 370 O. G. 757)

This invention relates to ultra-high frequency radio circuits, and it is particularly directed to a novel resonant crcuit or inductor for use therein.

The conventional design of resonant circuit or inductor for use in radio circuits comprises a coil shunted by a variable capacitor made up of two or more intermeshing plates or sets of plates, the capacitance being varied by moving one set of plates nearer to or farther away from the other set. For circuits resonant at the ultra-high frequencies this design is generally inefficient since a substantial portion of the total circuit inductance is in the variable capacitor because of the necessary physical dimensions of the capacitor structure and the low values of total circuit inductance usually required. External devices, such as vacuum tubes, when connected to such circuits in a practicable way, are then connected to only a portion of the total tuned circuit inductance, or in effect, "tapped down" on the total inductance. Utilization of practically all of the effective voltage developed across the tuned circuit is of utmost importance in ultra-high frequency equipment, which is the main reason why lumped, tuned circuits have usually been abandoned at high frequencies and replaced by some form of transmission line or resonant cavity arrangement.

In addition, conventional lumped, tuned circuits require at least one moving contact to the capacitor rotor, and such contacts usually introduce noise and sometimes instability at ultra-high frequencies.

This invention provides a new form of tuned inductor for use at ultra-high frequencies, of small structure, which is substantially free from the above disadvantages of conventional devices, is simple and rugged in construction and is characterized by the relatively wide frequency range over which it may be tuned. In particular, a much greater proportion of the voltage developed across the tuned circuit is made available for application to external apparatus, and moving electrical contacts are obviated.

The tuned inductor of this invention comprises, broadly, a simple inductor in the form of a coil having one (or more) turns and a parallel-connected capacitor formed by the ends of the coil itself, the capacitance being varied by adjustment of a movable member positioned to come very close to the ends of the coil. The ends of the coil may be flattened or connected to a pair of small plates where greater area is necessary to obtain the desired capacitance, but in the preferred form the inductor consists of a single turn, which can be constructed of a flat strip, the ends of which are made to provide the required area for condenser plates. The device is preferably designed so that the movable member may slide or rotate between the ends of the coil, so that the amount of space filled with dielectric is varied. This member is unlike the rotors of conventional variable capacitors in that it need not be a conductor. In fact, one form employs a rotor, or movable member, consisting of a low-loss material of high dielectric constant, designed to occupy substantially all of the space between the ends of the coil at maximum capacitance (minimum resonant frequency). By moving this dielectric material in relation to the ends of the coil the capacitance between the ends is changed and the resonant frequency of the tuned circuit is altered.

It is generally most convenient to mount the member on a shaft and rotate it between the ends of the coil, and the member may be given any desired shape or curve to vary the capacitance according to some particular function of the displacement of the member.

The material of which the movable member is made (or is essentially made of) must be a dielectric having a low power factor (low-loss) at high frequencies, such as various ceramics and certain resins. For maximum efficiency and tuning range the movable member is made essentially of a low-loss resin highly pigmented with rutile (or another substance having high dielectric constant). Such compositions are preferable to ceramics because they are easily machineable to small tolerances, and they are easily prepared. A preferred composition for use in this invention is pigmented polystyrene containing essentially rutile. The rutile is dispersed in the polystyrene (or other resin) in the form of a fine powder, preferably 200 mesh or finer. Any standard ball, pebble or roller mill may be used for this purpose, solvent being used to soften or dissolve the resin if it is thermoplastic, or if it is a thermosetting resin the rutile is dispersed therein before complete polymerization. The suspension of rutile in resin is molded in the form desired or even coated on a structure or support, and then the molded product is smoothed or machined so that it will just clear the ends of the coil.

Figure 2:
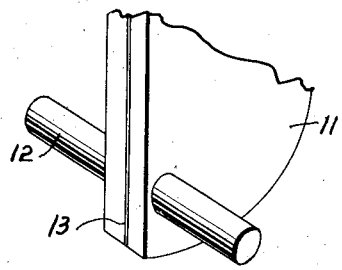

In the drawing, Fig. 1 is a pictorial representation of one form which the invention may assume; and Fig. 2 shows a modified type of rotor which may be employed in conjunction with the inductor of Fig. 1.

A typical construction of the tuned inductor of this invention is shown in Fig. 1, in which an inductor 10 consisting of a single turn in the form of a C has smoothed and aligned ends between which a thin plate 11 of a rutile-pigmented polystyrene resin can pass. The plate 11 is rigidly mounted on a dielectric shaft 12 which may be supported by the inductor 10 as shown.

The use of a thin metallic plate positioned in the center of the dielectric or between two dielectric segments provides a symmetrically tuned inductance having a "split stator" capacitor and also provides a strong mechanical structure with relatively high capacity (if desired). The variable capacitance provided by the movable dielectric is substantially free of distributed inductance, thus allowing effective utilization of the resonant voltages developed across the tuned circuit.

Tests have shown that an easily machinable, strong, pigmented polystyrene resin containing essentially rutile can be easily made having a dielectric constant as high as 25 (rutile has an average dielectric constant of 85). The amount of pigment employed is largely a matter of choice, although obviously the dielectric constant of the composition (and hence tuning range of the tuned inductance) increases with increasing pigment concentration.

The pigment particle size is not critical, although it is obvious that the finer the particles are the better is the machineability of the composition, or the greater is the pigment concentration which can be obtained while maintaining a given machineability and toughness.

Many modifications will be apparent to those skilled in the art, and the invention should not be limited other than as defined by the appended claims.

The invention described herein may be manufactured and used by or for the Government of the United States of America for governmental purposes without the payment of any royalties thereon or therefor.

I claim:

1. A tunable circuit structure for use in ultra-high frequency radio circuits which comprises an inductance having at least one turn, the ends of which are positioned and shaped to form a capacitance in parallel with said inductance, and a movable member positioned so as to move adjacent said ends and thereby change said capacitance, said movable member comprising a low-loss dielectric material of high dielectric constant shaped to change the capacitance of the condenser as a function of the shape of the dielectric member and its position between the ends of the loop.

2. A tunable circuit structure for use in ultra-high frequency radio circuits which comprises an inductance having at least one turn, the ends of which face each other and are shaped to form a capacitance in parallel with said inductance, and a movable member positioned so as to move between said ends and to occupy substantially all of the space therebetween, said member comprising a low-loss dielectric material of high dielectric constant shaped to change the capacitance of the condenser as a function of the shape of the dielectric member and its position between the ends of the loop.

3. A tunable circuit structure for use in ultra-high frequency radio circuits which comprises an inductance having a single turn in the form of a C, the ends of which face each other and are shaped to form a capacitance in parallel with said inductance, and a movable member positioned so as to move between said ends in a plane perpendicular to the plane of the inductive loop and to occupy substantially all of the space therebetween, said movable member being shaped to change the capacitance as a function of its shape and position between the ends of the loop.

EMERICK TOTH.